US008091415B2

(12) United States Patent
Matsunaga et al.

(10) Patent No.: US 8,091,415 B2
(45) Date of Patent: Jan. 10, 2012

(54) APPARATUS FOR AND METHOD OF DETECTING ABNORMALITY IN EXHAUST GAS TEMPERATURE SENSOR

(75) Inventors: Hideki Matsunaga, Saitama (JP); Toshikazu Katou, Saitama (JP)

(73) Assignee: UD Trucks Corporation, Ageo-shi (JP)

( * ) Notice: Subject to any disclaimer, the term of this patent is extended or adjusted under 35 U.S.C. 154(b) by 0 days.

(21) Appl. No.: 12/408,705

(22) Filed: Mar. 22, 2009

(65) Prior Publication Data

US 2010/0071451 A1 Mar. 25, 2010

Related U.S. Application Data

(63) Continuation of application No. PCT/JP2007/063295, filed on Jul. 3, 2007.

(30) Foreign Application Priority Data

Sep. 22, 2006 (JP) .................................. 2006-257987

(51) Int. Cl.
*G01M 15/10* (2006.01)
(52) U.S. Cl. ................................. 73/114.69; 73/114.77
(58) Field of Classification Search ............... 73/114.69, 73/114.71, 114.75, 114.76, 114.77
See application file for complete search history.

(56) References Cited

U.S. PATENT DOCUMENTS

| 5,388,454 A | 2/1995 | Kuroda et al. |
| 5,860,277 A | 1/1999 | Schnaibel et al. |
| 6,302,065 B1 | 10/2001 | Davison |
| 6,952,953 B2 * | 10/2005 | Plote et al. ................. 73/114.69 |
| 7,418,322 B2 * | 8/2008 | Kariya et al. ..................... 701/34 |
| 7,429,128 B2 * | 9/2008 | Izumiura et al. .............. 374/144 |
| 2005/0102076 A1 | 5/2005 | Kariya et al. |

FOREIGN PATENT DOCUMENTS

| JP | 02-305309 | | 12/1990 |
| JP | 04-342855 | A | 11/1992 |
| JP | 2002122039 | A | 4/2002 |
| JP | 2003-149054 | | 5/2003 |
| JP | 2005140069 | A | 6/2005 |
| JP | 2006022730 | A | 1/2006 |
| WO | 01/40636 | A2 | 6/2001 |

OTHER PUBLICATIONS

English translation of Office Action from related Japanese Application No. 2006-257987, mailed Jul. 26, 2011.

* cited by examiner

*Primary Examiner* — Eric S McCall
(74) *Attorney, Agent, or Firm* — Baker & Hostetler LLP

(57) ABSTRACT

On the basis of a correlation between exhaust gas temperature detected by an exhaust gas temperature sensor and exhaust gas temperature estimated according to an engine operating condition, it is detected whether or not abnormality occurs in the exhaust gas temperature sensor. Namely, when a change characteristic of the detected exhaust gas temperature follows a change characteristic of the estimated exhaust gas temperature, it is determined that the exhaust gas temperature sensor is normal. On the other hand, when the change characteristic of the detected exhaust gas temperature does not follow that of the estimated exhaust gas temperature, it is determined that the exhaust gas temperature sensor is abnormal.

16 Claims, 3 Drawing Sheets

APPARATUS FOR AND METHOD OF DETECTING ABNORMALITY IN EXHAUST GAS TEMPERATURE SENSOR

CROSS-REFERENCE TO RELATED APPLICATIONS

This application is a continuation of PCT/JP2007/063295, filed on Jul. 3, 2007 and entitled "Device and Method for Detecting Abnormality of Exhaust Gas Temperature Sensor," which claims priority to Japanese patent application No. 2006-257987, filed on Sep. 22, 2006, the disclosures of which are incorporated herein by reference in their entirety.

FIELD OF THE INVENTION

The present invention relates to an apparatus for and method of detecting abnormality in an exhaust gas temperature sensor.

BACKGROUND OF THE INVENTION

An exhaust gas temperature sensor is used, for example, for an exhaust gas purifying system for purifying NOx included in exhaust gas emitted from an engine. In the system, in order to add a proper amount of a reducing agent to the exhaust gas, the addition amount of the reducing agent is increased/decreased according to exhaust gas temperature detected by an exhaust gas temperature sensor. However, when abnormality such as a failure occurs in the exhaust gas temperature sensor, the proper amount of the reducing agent may not be added to the exhaust gas. To address the problem, an abnormality detecting apparatus for detecting abnormality in the exhaust gas temperature sensor is provided.

The exhaust gas temperature sensor is roughly classified into a thermister type and a platinum-resistance type. An exhaust gas temperature sensor of the thermister type has an output characteristic that the resistance value (output voltage) decreases nonlinearly as the temperature rises. Namely, when the exhaust gas temperature is low, the resistance value is high, and when the exhaust gas temperature is high, the resistance value is low. When abnormality occurs in the exhaust gas temperature sensor, for example, in the case of sensor short-circuit, the resistance value indicates a value in a high-temperature range. In the case of disconnection, the resistance value indicates a value in a low-temperature range.

In the case of sensor short-circuit, an output of the exhaust gas temperature sensor is largely lower than a resistance value which can be output in a normal state, thus the sensor short-circuit can be detected. However, in the case of disconnection, an output of the exhaust gas temperature sensor is similar to the output characteristic at the low temperature, thus it is difficult to detect the disconnection.

In conventional techniques, although short-circuit and disconnection of an exhaust gas temperature sensor can be detected, since abnormality is detected using a threshold defining a normal range and an abnormal range, abnormality which occurs in the normal range may not be detected. In this case, for example, abnormality can be supposed such that, an output of the exhaust gas temperature sensor changes according to the exhaust temperature rise, however, when the exhaust gas temperature rises to a certain temperature, the output thereof does not change and is fixed to an almost constant value for some reason at the certain exhaust gas temperature.

Therefore, focused on the fact that exhaust gas temperature rises immediately after start of the engine, an apparatus for detecting abnormality in an exhaust gas temperature sensor is needed to at least detect occurrence of disconnection when the exhaust gas temperature sensor cannot detect an output of a predetermined value or larger.

SUMMARY OF THE INVENTION

Embodiments of the present invention advantageously provide an apparatus for and method of detecting abnormality in an exhaust gas temperature sensor, capable of determining abnormality in an entire temperature range that can be detected by the exhaust gas temperature sensor.

According to embodiments of the present invention, a control unit incorporating therein a computer estimates an exhaust gas temperature according to an engine operating condition, and it is determined that whether or not the estimated exhaust gas temperature is in a transient state in which exhaust gas temperature changes. In the transient state, on the basis of a correlation between a change characteristic of the estimated exhaust gas temperature and a change characteristic of the exhaust gas temperature detected by an exhaust gas temperature sensor, it is determined whether or not abnormality occurs in the exhaust gas temperature sensor. As the "engine operating state," engine rotation speed, fuel injection amount, intake flow rate, intake negative pressure, torque, charging pressure and the like, can be applied.

According to embodiments of the present invention, on the basis of an existence of the correlation between a change characteristic of the exhaust gas temperature estimated by a control unit and a change characteristic of the exhaust gas temperature detected by an exhaust gas temperature sensor, it is determined whether or not abnormality occurs in the exhaust gas temperature sensor. That is, as the basic principle, when the estimated exhaust gas temperature changes, the detected exhaust gas temperature changes. When the detected exhaust gas temperature does not change according to a change in the estimated exhaust gas temperature, abnormality in the exhaust gas temperature sensor is determined. Consequently, abnormality is determined in an entire temperature range which can be detected by the exhaust gas temperature sensor, and abnormality can be detected. Abnormality in the entire temperature range includes abnormality which occurs in the normal range. Therefore, for example, when an output of the exhaust gas temperature sensor changes and the exhaust gas temperature rises to a certain exhaust gas temperature in the normal range, abnormality can be also determined, such that the output does not change and is fixed to an almost constant value for some reason at the certain exhaust temperature.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
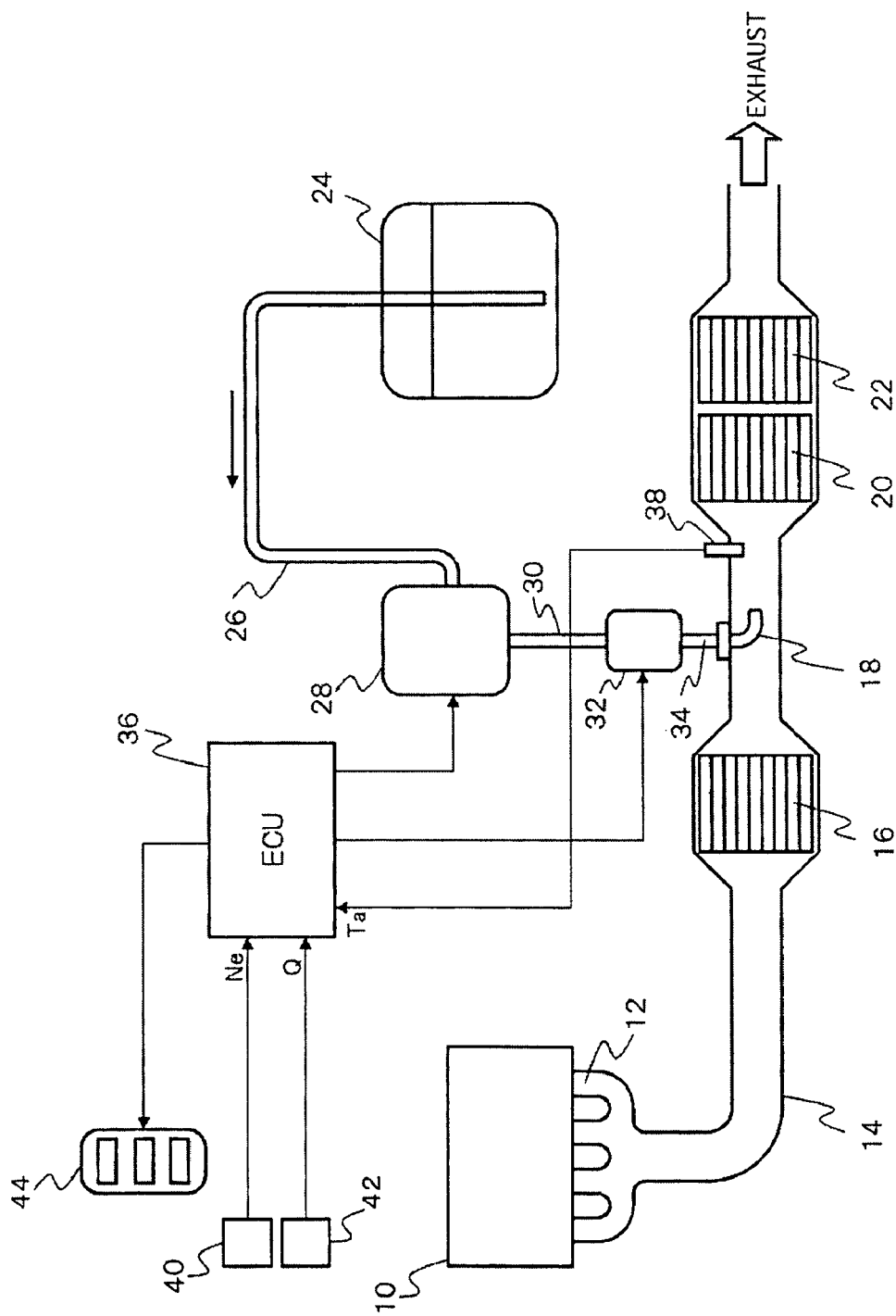
FIG. 1 illustrates a configuration of an exhaust gas purifying apparatus including an apparatus for detecting abnormality in an exhaust gas temperature sensor, in accordance with an embodiment of the present invention.

The invention will now be described with reference to the drawing figures, in which like reference numerals refer to like parts throughout.

FIG. 1 illustrates an entire configuration of an exhaust gas purifying apparatus having an apparatus for detecting abnormality in an exhaust gas temperature sensor of the present invention. The exhaust gas purifying apparatus purifies NOx in the exhaust gas emitted from engine by a reductive reaction using urea aqueous solution as precursor of a reducing agent.

In an exhaust pipe 14 connected to an exhaust manifold 12 of an engine 10, there are disposed, along flow direction of the exhaust emission in the order, a nitrogen oxidation catalyst converter 16 for oxidizing nitrogen monoxide (NO) to nitrogen dioxide ($NO_2$), an injection nozzle 18 for injection-supplying urea aqueous solution, an NOx reducing catalyst converter 20 for reductively purifying NOx by using ammonia obtained by hydrolyzing the urea aqueous solution, and an ammonia oxidation catalyst converter 22 for oxidizing ammonia passed through the NOx reducing catalyst converter 20.

A reducing agent tank 24 for storing the urea aqueous solution is communicatively connected with a pump module 28 for sucking the urea aqueous solution and pressure-feeding it, via a suction hose 26 whose suction opening is open at the bottom of the reducing agent tank 24. The pump module 28 is communicatively connected with an addition module 32 incorporating therein at least a flow control valve which can be remotely operated via a pressure hose 30. The addition module 32 is communicatively connected with the injection nozzle 18 via an addition hose 34. Each of the pump module 28 and the addition module 32 is electronically controlled by a reducing agent addition control unit (to be referred to as "reducing agent addition ECU", hereunder) 36 incorporating therein a computer. The urea aqueous solution is injecting-supplied from the injection nozzle 18 only by an amount adapted to an exhaust temperature (to be referred to as "detected temperature", hereunder) Ta detected by an exhaust gas temperature sensor 38 and other engine operating condition. As the other engine operating condition, for example, engine rotation speed Ne detected by an engine rotation speed sensor 40, an engine load Q, such as fuel injection amount, intake flow rate, intake negative pressure, required torque, charging pressure and the like, detected by the engine load sensor 42 can be applied.

In the exhaust gas purifying apparatus, the urea aqueous solution injection-supplied from the injection nozzle 18 is hydrolyzed by exhaust heat and steam in the exhaust gas, and converted to ammonia functioning as the reducing agent. It is known that the converted ammonia reductively reacts with NOx in the exhaust gas in the NOx reducing catalyst converter 20 to be converted into water ($H_2O$) and nitrogen ($N_2$). At this time, in order to improve the NOx purifying performance in the NOx reducing catalyst converter 20, NO is oxidized to $NO_2$ by the nitrogen oxidation catalyst converter 16, so that the ratio between NO and $NO_2$ in the exhaust gas is improved so as to be adapted to the reduction reaction. On the other hand, ammonia passed through the NOx reducing catalyst converter 20 is oxidized by the ammonia oxidation catalyst converter 22 disposed on the exhaust gas downstream side of the NOx reducing catalyst converter 20, and therefore, ammonia is prevented from being directly discharged into atmosphere.

The abnormality detecting apparatus of the present embodiment includes the reducing agent addition ECU 36, engine rotation speed sensor 40, an engine load sensor 42, and a warning device 44. The reducing agent addition ECU 36 receives output signals from such sensors, executes a control program stored in its ROM (Read Only Memory) or the like, and perform exhaust gas temperature estimating process, transient state determining process, abnormality determining process, canceling process, and warning process. The reducing agent addition ECU 36 calculates to estimate an exhaust gas temperature Tc from an exhaust gas temperature map according to the engine operating condition, and compares a change in the estimated exhaust gas temperature (to be referred to as "estimated temperature", hereunder) Tc with a change in the detected temperature Ta, to thereby detect abnormality in an exhaust gas temperature sensor 38. The exhaust gas temperature map is obtained by integrating exhaust gas temperature data obtained by testing the engine under various environments. When the reducing agent addition ECU 36 detects abnormality in the exhaust gas temperature sensor 38, in order to notify of the abnormality, it operates the warning device 44 such as a warning lamp, a buzzer and the like. The control program does not always have to be executed by the reducing agent addition ECU 36, but may be executed by a control unit dedicated to the control program, an engine control unit, or other in-vehicle control unit.

Figure 2:
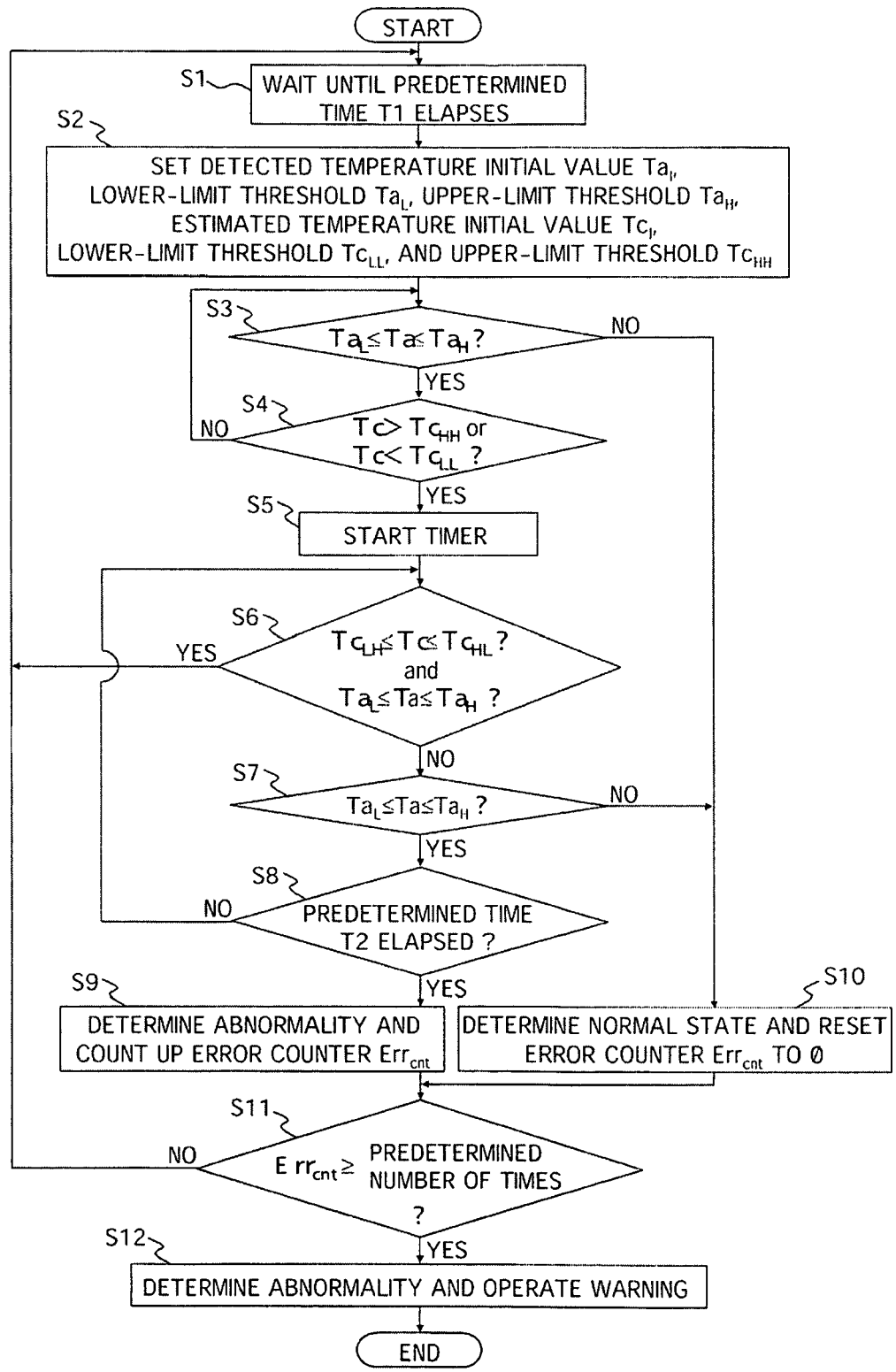
FIG. 2 is a flowchart of a method of detecting abnormality in an exhaust gas temperature sensor, in accordance with an embodiment of the present invention.

The abnormality detecting operation of the abnormality detecting apparatus, according to an embodiment of the present invention, is described with reference to the flowchart of FIG. 2.

In step 1 (S1 in FIG. 2, the same rule applies to subsequent steps), the apparatus waits until a predetermined time T1 (first predetermined time) counted by a timer elapses after start of the engine 10.

In step 2, the apparatus sets the detected temperature Ta to a detected temperature initial value $Ta_I$ and sets the estimated temperature Tc to an estimated temperature initial value $Tc_I$. The apparatus sets a lower-limit threshold $Ta_L$ and an upper-limit threshold $Ta_H$ defining a predetermined range (predetermined temperature width) adopting the detected temperature initial value $Ta_I$ as a center. Similarly, the apparatus sets a lower-limit threshold $Tc_{LL}$ and an upper-limit threshold $Tc_{HH}$ defining a predetermined range adopting the estimated temperature initial value $Tc_I$ as a center. In the embodiment, the range from the lower-limit threshold $Tc_{LL}$ to the upper-limit threshold $Tc_{HH}$ are set to be larger than the range from the lower-limit threshold $Ta_L$ to the upper-limit threshold $Ta_H$. The lower-limit temperature width from the initial values $Ta_I$ and $Tc_I$ to the lower-limit thresholds $Ta_L$ and $Tc_{LL}$ and the upper-limit temperature width from the initial values $Ta_I$ and $Tc_I$ to the upper-limit thresholds $Ta_H$ and $Tc_{HH}$ may be set different from each other.

In step 3, it is determined whether or not the detected temperature Ta is equal to or larger than the lower-limit threshold $Ta_L$ and equal to or less than the upper-limit threshold $Ta_H$. That is, it is determined whether or not the detected temperature Ta lies in the upper and lower threshold range. When the detected temperature Ta lies in the upper and lower threshold range ($Ta_L \leq Ta \leq Ta_H$) (Yes), the routine proceeds to step 4. On the other hand, when the detected temperature Ta is out of the upper and lower threshold range ($Ta > Ta_H$, or $Ta < Ta_L$) (No), it is regarded that the exhaust gas temperature sensor 38 operates normally, so that the routine proceeds to step 10.

In step 4, in order to enable abnormality determination to be performed in the whole temperature range output from the exhaust gas temperature sensor 38, as a trigger to start the abnormality determination described below, it is determined whether or not the estimated temperature Tc is over the upper-limit threshold $Tc_{HH}$ or below the lower-limit threshold $Tc_{LL}$. That is, whether the estimated temperature Tc is out of the upper and lower threshold range or not is determined. When the estimated temperature Tc is out of the upper and lower threshold range ($Tc > Tc_{HH}$, or $Tc < Tc_{LL}$) (Yes), the apparatus determines that the estimated temperature Tc is in the transient state in which the exhaust gas temperature changes, and the routine proceeds to step 5. On the other hand, when the estimated temperature Tc lies in the upper and lower threshold range ($Tc_{LL} \leq Tc \leq Tc_{HH}$) (No), the routine returns to step 3. As described above, a change rate of the estimated temperature Tc can be used as a trigger to start the abnormality determination described later. For example, another flow may be applied such that, when the change rate of the estimated temperature Tc is equal to or higher than a predetermined rate, the apparatus determines that the estimated temperature Tc is in the transient state where the exhaust gas temperature changes, and the routine proceeds to step 5.

In step 5, the apparatus starts the timer.

In step 6, the apparatus determines whether or not the estimated temperature Tc lies in the upper and lower threshold range of estimated temperature initial value $Tc_I$ and whether or not the detected temperature Ta lies in the upper and lower threshold range. The upper and lower thresholds of the estimated temperature initial value $Tc_I$ in this case are set a narrow range (from the lower-limit threshold $Tc_{LH}$ to the upper-limit threshold $Tc_{HL}$) compared with the predetermined range defined by the lower-limit threshold $Tc_{LL}$ and the upper-limit threshold $Tc_{HH}$. This is a temperature width in which the case where precision of the estimated temperature Tc deteriorates due to noise or the like is considered. When the estimated temperature Tc lies in the upper and lower threshold range and the detected temperature Ta lies in the upper-limit threshold range ($Tc_{LH} \leq Tc \leq Tc_{HL}$ and $Ta_L \leq Ta \leq Ta_H$) (Yes), a determination of occurrence of abnormality in the exhaust gas temperature sensor 38 is cancelled, and the routine returns to step 1. As described above, when the precision of the estimated temperature Tc deteriorates due to noise or the like, the determining process is cancelled, so that the abnormality detection precision can be improved. In the other cases (No), the routine proceeds to step 7.

In step 7, it is determined whether or not the detected temperature Ta is equal to or larger than the lower-limit threshold $Ta_L$ and equal to or less than the upper-limit threshold $Ta_H$. That is, it is determined whether or not the detected temperature Ta lies in the upper and lower threshold range. When the detected temperature Ta lies in the upper and lower threshold range ($Ta_L \leq Ta \leq Ta_H$) (Yes), the routine proceeds to step 8. On the other hand, when the detected temperature Ta is out of the upper and lower threshold range ($Ta > Ta_H$, or $Ta < Ta_L$) (No), it is regarded that the exhaust gas temperature sensor 38 normally operates, and the routine proceeds to step 10.

In step 8, the apparatus determines whether or not a predetermined time T2 (second predetermine time) counted by the timer has elapsed. When the predetermined time T2 counted by the timer has elapsed (Yes), the routine proceeds to step 9. On the other hand, when the predetermined time T2 counted by the timer has not elapsed (No), the routine returns to step 6.

The predetermined time T2 is a time width in which the case where the detected temperature Ta changes behind a change in the estimated temperature Tc is considered. By the operation, the abnormality detection precision further improves.

In step 9, although the estimated temperature Tc fluctuates to be out of the upper and lower threshold range of the estimated temperature initial value $Tc_I$, the detected temperature Ta lies in the upper and lower threshold range ($Ta_L \leq Ta \leq Ta_H$) of the detected temperature initial value $Ta_I$, so that the apparatus determines that the sensor is abnormal. That is, since the change characteristic of the estimated temperature Tc and that of the detected temperature Ta are not similar to each other, the apparatus determines that the sensor is abnormal, and counts up an error counter $Err_{cnt}$.

On the other hand, in step 10, the apparatus determines that the exhaust gas temperature sensor 38 is normal, and resets the error counter $Err_{cnt}$ to 0.

In step 11, the apparatus determines whether or not the error counter $Err_{cnt}$ has reached a predetermined number of times (for example, four times). This is because noise or the like may be superimposed to an output of the exhaust gas temperature sensor 38, to thereby determine abnormality. Further, in order to improve the abnormality detection precision, the operation is intended not to immediately determine abnormality by single abnormality determination but determines after abnormality is determined successively by the predetermined number of times. When the error counter $Err_{cnt}$ reaches the predetermined number of times (Yes), the routine proceeds to step 12. On the other hand, when the error counter $Err_{cnt}$ has not reached the predetermined number of times (No), the routine returns to step 1.

In step 12, abnormality in the exhaust gas temperature sensor 38 is determined, and, in order to notify of the abnormality detection, the apparatus operates the warning device 44. The warning device 44 which receives the notification generates a warning sound or a warning lamp. By the warning sound or warning lamp, the abnormality can be notified, and a proper step can be taken.

Figure 3:
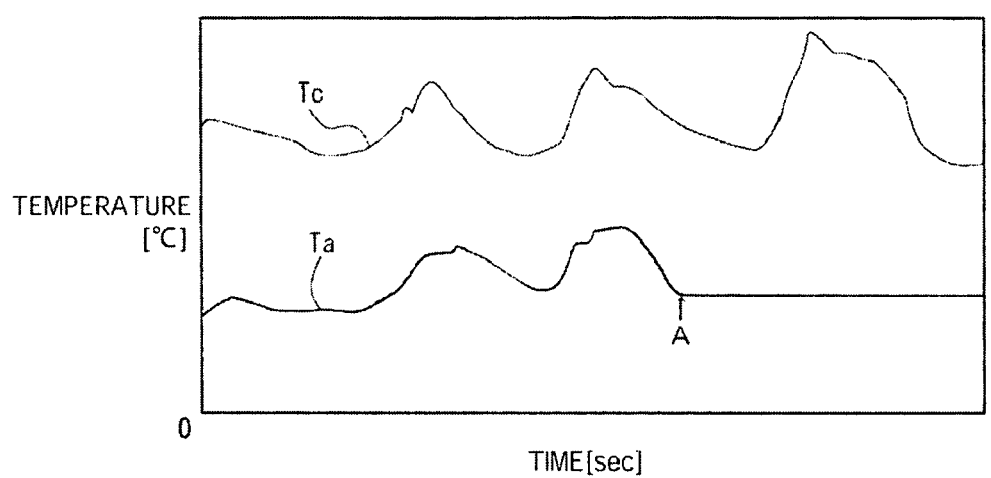
FIG. 3 is a status view of exhaust temperature gas Ta detected by the exhaust gas temperature sensor and exhaust gas temperature Tc estimated by exhaust temperature estimating process, in accordance with an embodiment of the present invention.

As described above, the abnormality in the exhaust gas temperature sensor 38 is detected according to the fact that the change characteristic of the estimated temperature Tc and that of the detected temperature Ta have a correlation therebetween. This is on the basis of the basic principle, as recognized in FIG. 3, is that when the estimated temperature Tc changes, the detected temperature Ta also changes. As illustrated in FIG. 3, when the exhaust gas temperature sensor 38 is normal, the detected temperature Ta changes with a change in the estimated temperature Tc. That is, the detected temperature Ta changes with the correlation with a change in the estimated temperature Tc. On the other hand, when the exhaust gas temperature sensor 38 is abnormal, the detected temperature Ta does not change even when the estimated temperature Tc changes (after a point A in FIG. 3). As described above, when the detected temperature Ta does not change according to a change in the estimated temperature Tc, it is detected that the exhaust gas temperature sensor 38 is abnormal. Therefore, in the present invention, not only the abnormality such as short-circuit, disconnection or the like in the sensor, but also abnormality such that, for example, the detected temperature Ta changes to rise to a certain temperature and is fixed to a constant value without fluctuation from the certain temperature for some reason can be also detected. Consequently, in the invention, the abnormality in the entire temperature range which can be detected by the exhaust gas temperature sensor 38 can be detected.

In the above, as an embodiment of the present invention, the apparatus for detecting abnormality of the exhaust gas temperature sensor applied to the exhaust gas purifying apparatus is described. The apparatus for detecting abnormality may be applied to a DPF (Diesel Particulate Filter) and the like.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. An apparatus for detecting abnormality in an exhaust gas temperature sensor, comprising:
    an exhaust gas temperature sensor for detecting exhaust gas temperature of an engine; and
    a control unit, including a computer, adapted to execute:
        an exhaust gas temperature estimating process for estimating exhaust gas temperature based on engine rotation speed and engine load;
        a transient state determining process for determining whether or not the estimated temperature is in a transient state in which the exhaust gas temperature changes; and
        an abnormality determining process for determining, when the transient state determining process determines that the estimated temperature is in the transient state, whether or not abnormality occurs in the exhaust gas temperature sensor on the basis of a correlation between a change characteristic of the exhaust gas temperature estimated by the exhaust gas temperature estimating process and a change characteristic of the exhaust gas temperature detected by the exhaust gas temperature sensor,
    wherein the transient state determining process determines that, when the exhaust gas temperature estimated by the exhaust gas temperature estimating process changes by a predetermined temperature within a first predetermined time, the estimated temperature is in the transient state in which the exhaust gas temperature changes.

2. The apparatus according to claim 1, wherein the abnormality determining process determines that, when the change characteristic of the exhaust gas temperature detected by the exhaust gas temperature sensor and the change characteristic of the exhaust gas temperature estimated by the exhaust gas temperature estimating process are not similar to each other, abnormality occurs in the exhaust gas temperature sensor.

3. The apparatus according to claim 1, wherein the abnormality determining process determines abnormality of the exhaust gas temperature sensor after a determination of occurrence of abnormality in the exhaust gas temperature sensor is performed successively a by predetermined number of times.

4. The apparatus according to claim 1, wherein the control unit further executes a warning process of making a warning device operate when the abnormality determining process determines that abnormality occurs in the exhaust gas temperature sensor.

5. An apparatus for detecting abnormality in an exhaust gas temperature sensor, comprising:
    an exhaust gas temperature sensor for detecting exhaust gas temperature of an engine; and
    a control unit, including a computer, adapted to execute:
    an exhaust gas temperature estimating process for estimating exhaust gas temperature based on engine rotation speed and engine load,
    a transient state determining process for determining whether or not the estimated temperature is in a transient state in which the exhaust gas temperature changes; and
    an abnormality determining process for determining, when the transient state determining process determines that the estimated temperature is in the transient state, whether or not abnormality occurs in the exhaust gas temperature sensor on the basis of a correlation between a change characteristic of the exhaust gas temperature estimated by the exhaust gas temperature estimating process and a change characteristic of the exhaust gas temperature detected by the exhaust gas temperature sensor,
    wherein the transient state determining process determines that, when a change rate of the exhaust gas temperature estimated by the exhaust gas temperature estimating process is equal to or higher than a predetermined rate, the estimated temperature is in the transient state in which the exhaust gas temperature changes.

6. The apparatus according to claim 5, wherein the abnormality determining process determines that, when the change characteristic of the exhaust gas temperature detected by the exhaust gas temperature sensor and the change characteristic of the exhaust gas temperature estimated by the exhaust gas temperature estimating process are not similar to each other, abnormality occurs in the exhaust gas temperature sensor.

7. The apparatus according to claim 5, wherein the abnormality determining process determines abnormality of the exhaust gas temperature sensor after a determination of occurrence of abnormality in the exhaust gas temperature sensor is performed successively a predetermined number of times.

8. The apparatus according to claim 5, wherein the control unit further executes a warning process of making a warning device operate when the abnormality determining process determines that abnormality occurs in the exhaust gas temperature sensor.

9. An apparatus for detecting abnormality in an exhaust gas temperature sensor, comprising:
    an exhaust gas temperature sensor for detecting exhaust gas temperature of an engine: and
    a control unit, including a computer adapted to execute:
        an exhaust gas temperature estimating process for estimating exhaust gas temperature based on engine rotation speed and engine load, a transient state determining process for determining whether or not the estimated temperature is in a transient state in which the exhaust gas temperature changes: and an abnormality determining process for determining, when the transient state determining process determines that the estimated temperature is in the transient state, whether or not abnormality occurs in the exhaust gas temperature sensor on the basis of a correlation between a change characteristic of the exhaust gas temperature estimated by the exhaust gas temperature estimating process and a change characteristic of the exhaust gas temperature detected by the exhaust gas temperature sensor, wherein the change characteristic of the exhaust gas temperature detected by the exhaust gas temperature sensor is a change characteristic of the exhaust gas temperature in a second predetermined time after the transient state determining process determines that the estimated temperature is in the transient state, and the control unit further executes a canceling process of canceling a determination of whether or not abnormality occurs in the exhaust gas temperature sensor when the change in the exhaust gas temperature estimated by the exhaust gas temperature estimating process lies in a predetermined range adopting temperature when the determination of whether or not the estimated temperature is in the transient state starts, as a center, within the second predetermined time.

10. The apparatus according to claim 9, wherein the abnormality determining process determines that, when the change characteristic of the exhaust gas temperature detected by the exhaust gas temperature sensor and the change characteristic exhaust gas temperature estimated by the exhaust gas temperature estimating process are not similar to each other, abnormality occurs in the exhaust gas temperature sensor.

11. The apparatus according to claim 9, wherein the abnormality determining process determines abnormality of the exhaust gas temperature sensor after a determination of occurrence of abnormality in the exhaust gas temperature sensor is performed successively a predetermined number of times.

12. The apparatus according to claim 9, wherein the control unit further executes a warning process of making a warning device operate when the abnormality determining process determines that abnormality occurs in the exhaust gas temperature sensor.

13. A method of detecting abnormality in an exhaust gas temperature sensor, comprising:
 detecting an exhaust gas temperature using an exhaust gas temperature sensor;
 estimating exhaust gas temperature based on engine rotation speed and engine load;
 determining whether or not the estimated temperature is in a transient state in which the exhaust gas temperature changes;
 when the estimated temperature is determined to be in the transient state, determining whether or not abnormality occurs in the exhaust gas temperature sensor on the basis of a correlation between a change characteristic of the estimated temperature and a change characteristic of the exhaust gas temperature detected by the exhaust gas temperature sensor which is a change characteristic of the exhaust gas temperature in a second predetermined time after determining that the estimated temperature is in the transient state; and
 canceling a determination of whether or not abnormality occurs in the exhaust gas temperature sensor when the change in the estimated temperature lies in a predetermined range adopting temperature when the determination of whether or not the estimated temperature is in the transient state starts, as a center, within the second predetermined time.

14. The method according to claim 13, wherein it is determined that abnormality occurs in the exhaust gas temperature sensor when the change characteristic of the exhaust gas temperature detected by the exhaust gas temperature sensor and the change characteristic of the estimated temperature are not similar to each other.

15. The method according to claim 13, wherein it is determined that abnormality occurs in the exhaust gas temperature sensor after a determination of occurrence of abnormality in the exhaust gas temperature sensor is performed successively a predetermined number of times.

16. The method according to claim 13, wherein when determining that an abnormality occurs in the exhaust gas temperature sensor, a warning device is operated.

* * * * *